Aug. 4, 1925.
R. C. JONES
1,548,781
SELF SCALING DEGASSING APPARATUS
Filed April 14, 1922    2 Sheets-Sheet 1
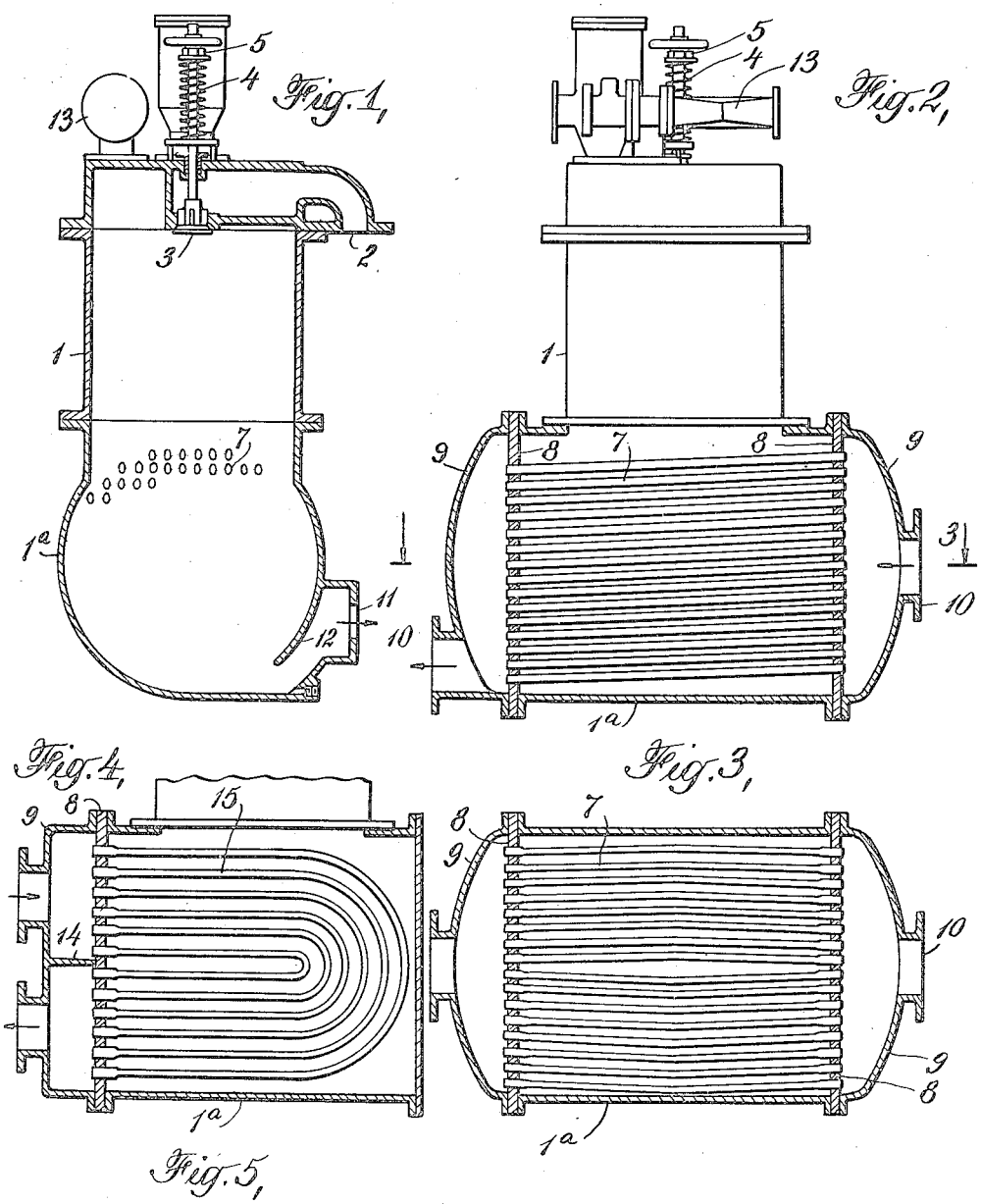
Inventor
Russell C. Jones
By his Attorneys
Pennie, Davis, Marvin, & Edmonds Aug. 4, 1925.
R. C. JONES
1,548,781
SELF SCALING DEGASSING APPARATUS
Filed April 14, 1922    2 Sheets-Sheet 2
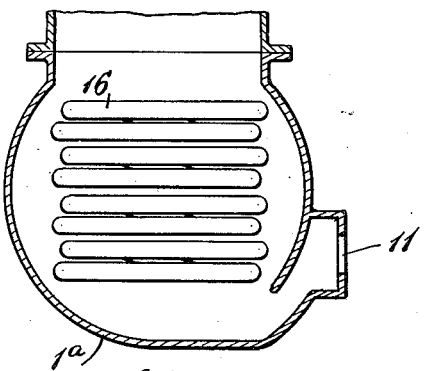
Fig. 6,
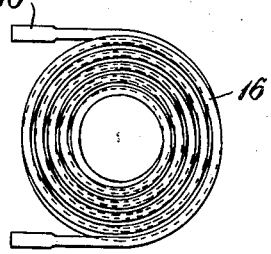 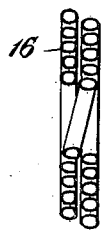 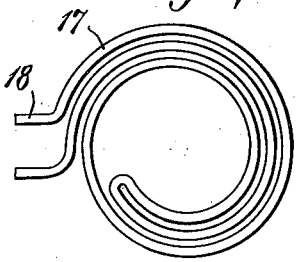
Fig. 7,   Fig. 8   Fig. 9,
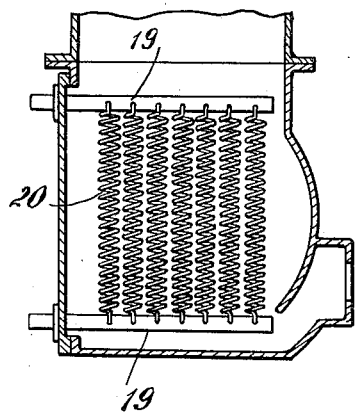
Fig. 10,
Inventor
Russell C. Jones
By his Attorneys
Pennie, Davis, Marvin & Edmonds Patented Aug. 4, 1925.

1,548,781

UNITED STATES PATENT OFFICE.

RUSSELL C. JONES, OF BRONXVILLE, NEW YORK, ASSIGNOR TO THE GRISCOM-RUSSELL COMPANY, OF NEW YORK, N. Y., A CORPORATION OF DELAWARE.

SELF-SCALING DEGASSING APPARATUS.

Application filed April 14, 1922. Serial No. 552,761.

*To all whom it may concern:*

Be it known that I, RUSSELL C. JONES, a citizen of the United States, residing at Bronxville, in the county of Westchester, State of New York, have invented certain new and useful Improvements in Self-Scaling Degassing Apparatus; and I do hereby declare the following to be a full, clear, and exact description of the invention, such as will enable others skilled in the art to which it appertains to make and use the same.

The present invention relates to an apparatus for degassing liquids, particularly such as boiler feed water supplied to steam generating systems, and has for its purpose in addition to eliminating the dissolved oxygen and other gases contained in the liquid, the precipitation of the various scale forming impurities and their subsequent removal from the parts of the apparatus.

Water available for use in steam boilers and the like invariably contains large quantities of air and other gases in solution, which gases cause a marked deterioration of the pipes and boilers due to corrosive action if not removed from the raw water before it is utilized in the system. It has been proposed, therefore, to provide some means for deaerating this raw water before it is passed on to the boilers. However, practically all waters available for boiler feed contain certain scale forming impurities, these impurities being normally contained in solution in the raw water but remaining in solution only as long as a sufficient amount of dissolved carbon dioxide is present. When the carbon dioxide is driven off the impurities immediately precipitate out as carbonates and settle upon the adjacent parts of the apparatus as an objectionable deposit of scale. The contained carbon dioxide is removed from the raw water by the boiling as practiced in the common degassing procedure, and the deposit of precipitated impurities must invariably be contended with in a degassing apparatus.

It has been proposed to remove the dissolved gases and impurities from the incoming liquid by preheating it and subsequently passing it into a region of reduced pressure, whereupon the contained heat of the liquid will effect a violent ebullition or flashing and will consequently liberate the contained gases. The precipitate of scale forming impurities collects in the bottom of the apparatus as a mud or slime and must be removed from time to time. Practically the same results may be accomplished by boiling the raw liquid at substantially atmospheric pressure. It has also been proposed to liberate the contained gases and precipitate out the scale forming impurities by subjecting the liquid to the action of a region of reduced pressure, and at the same time supplying heat to assist in the boiling process. By thus combining the two ideas a more rapid action is obtained and a correspondingly greater quantity of liquid may be treated in an apparatus of given size and weight. Considerable difficulty arises, however, in that the impurities precipitating out of the liquid rapidly accumulate upon the heating element and associated parts of the apparatus with the result that the heat transferring efficiency is soon lowered to such an extent as to render continued operation of the device impracticable without first shutting down and removing the coating of scale by scraping it from the affected parts.

It is a principal object of this invention to provide an apparatus of the above type which comprises means for supplying heat to the liquid under treatment and at the same time subjecting the liquid to the action of a partial vacuum, the construction of the heating element being such that the precipitated scale which accumulates on it may be removed in an easy and convenient manner.

It is a further object to provide in an apparatus of this type a heating element of such construction that during the normal operation of the apparatus, as heating fluid is admitted to the heating element in greater or less quantity or is shut off completely, a cracking action is exerted on the accumulated scale, which action tends to loosen the scale deposit and maintain the heat transferring surfaces in efficient condition.

It is also an object to provide an apparatus of this type in which, when operation is discontinued for the purpose of removing the precipitated impurities, the coating of scale can be readily removed from the affected parts without the necessity of manually scraping it off.

It is a still further object to provide in an apparatus of this type a heating element which may assume a wide range of forms so that it may readily be adapted to apparatus of various size, shape, and design.

In the preferred embodiment of my invention I provide a containing shell for receiving the liquid to be treated and in which the degassing and precipitating actions occur. The interior of the shell is maintained at a reduced pressure, by suitable means associated with the apparatus, for the purpose of lowering the boiling point of the liquid and facilitating the deærating process and the precipitation of the dissolved impurities. The liquid is introduced in the form of a spray so that the individual drops may be thoroughly exposed to the action of the partial vacuum and an opportunity afforded for an ebullition or flashing due to the contained heat of the liquid itself if it be sufficiently warm. I also provide an independent heating element which may consist of heat transferring surfaces of any suitable type maintained at a temperature sufficiently high to effect a partial vaporization of the liquid spray as it comes in contact with the surfaces. This boiling action serves to effectually liberate the contained gases and precipitate the dissolved impurities, the total quantity of heat required being materially reduced by reason of the low pressure under which the process is conducted.

The deposits of the precipitated impurities occur largely on the heat transferring surfaces of the heating element in the form of a scale which gradually destroys the heat transferring efficiency of the surfaces and must accordingly be scraped off at intervals. The scale occurs as a hard, brittle coating formed as a film covering the parts of the apparatus and which is at times exceedingly difficult to remove, particularly without damaging the more fragile parts of the apparatus such as the heating tubes, and the like. My invention contemplates an improved construction of heating element in which the accumulation of the scale deposits upon the heat transferring surfaces is minimized, and in which effects such as bridging over between adjacent turns of the heating coils, etc. may be effectually avoided. The invention also contemplates means for cracking off the scale when the apparatus is shut down for the purpose by providing a heating element whose surfaces may be flexed in such manner that the expansion and contraction will crack off the coating of scale, which will in large part fall to the bottom of the apparatus or cling but loosely to the surfaces. This flexing action of the heating surfaces is also obtained to a considerable extent during normal operation of the apparatus, inasmuch as it occurs whenever the heat transferring surfaces are subjected to a change in temperature.

I have illustrated a preferred embodiment of my invention in the accompanying drawings, in which Figure 1 is a vertical sectional view of an apparatus embodying my invention; Fig. 2 is a view, partly in section, looking from the left of Fig. 1; Fig. 3 is a horizontal sectional view taken on line 3—3 of Fig. 2; Fig. 4 is a vertical sectional view similar to Fig. 2 but illustrating a modified form of tube bundle; Fig. 5 is a sectional view of one of the heating tubes thus employed in the construction of Fig. 4; Fig. 6 is a partial vertical sectional view of an apparatus embodying my invention and employing a further modified type of heating element; Figs. 7 and 8 are a plan view and a sectional view, respectively, of one of the coil elements employed in the embodiment of Fig. 6; Fig. 9 is a plan view of a coil element of a type somewhat modified over that shown in Figs. 7 and 8; and, Fig. 10 is a partial vertical sectional view of an apparatus embodying my invention employing a further modified type of heating element.

Referring to the drawings, and particularly to Figs. 1 to 3, 1 indicates the containing shell of the apparatus which may consist of a single casing but is preferably cast in sections as shown for convenience in manufacturing. The liquid to be treated is admitted to the upper end of the shell through the inlet opening 2 whose inner end is in communication with a spring loaded valve 3, the strength of the spring 4 which maintains the valve in closed position depending on particular conditions and preferably being regulated by means of a nut 5 working on the threaded portion of the valve stem so that the spring may be put under greater or less compression depending on the position of the nut 5. The liquid enters through valve 3 in the form of a spray.

In the lower portion of the shell there is positioned a tube bundle 7 which may be of any convenient design, but is here shown as substantially circular in cross section and consisting of a plurality of tubes arranged in substantial parallelism between the supporting tube sheets 8 associated with the lower portion 1ª of the shell. Steam or other heating fluid is supplied to the tubes 7 and serves as heating medium therefor, covers 9 being fitted against the respective tube sheets 8 constituting inlet and outlet chambers in communication with the ends of the tube bundle and being provided with inlet and outlet openings 10. A discharge outlet 11 is provided on the shell portion 1ª through which the purified liquid may be withdrawn. The shell wall is preferably formed into a partition 12 extending below the level of the outlet 11, as shown, for the purpose of sealing off the passage between the body of the shell and the discharge outlet. The space within the apparatus is preferably maintained at a reduced pressure, a steam jet air ejector 13 being provided for this purpose. It is obvious, however, that the vacuum might be provided, for instance, by means of a vacuum pump, preferably operated from the steam supply which is invariably available.

When the liquid spray enters through the valve 3 the liquid drops are subjected to the influence of the reduced pressure within the shell, which tends to relieve a portion of the contained gases. After admission to apparatus the liquid drops fall upon the heating tubes 7 which tubes are maintained at a temperature sufficiently high to effect a partial vaporization of the liquid. The lower portion of the tube bundle is of course submerged, and the height to which the liquid rises along the tube bundle may be regulated by controlling the discharge from the apparatus. The ebullition of the body of liquid in the lower part of the shell 1$^a$, together with the vaporizing action occurring when the liquid drops fall upon the heating tubes 7 serves to effectually liberate in the well known manner the gases which are dissolved in the liquid and cause the dissolved impurities to precipitate out. Only a small proportion of the total volume of liquid is vaporized during the process. The evolved gases, such as air, carbon dioxide, and the like, are drawn upward, and are carried off through the ejector 13. The impurities which are precipitated out of the liquid accumulate chiefly on the heating tubes 7 in the form of a scale, which scale must be removed from time to time in order that the heating elements may operate efficiently.

The tubes 7 of the heating element are slanted from end to end, as shown in Fig. 2, so that the condensate forming in them may readily drain out at the lower ends of the tubes. As shown in Fig. 3, however, the tubes are bowed slightly either in a horizontal or vertical direction, opposite rows of tubes preferably being bowed in opposite directions as shown for the purpose of equalizing stresses which might otherwise occur on the tube sheets. If the bowed tubes 7 are subjected to an abrupt change in temperature, the resulting expansion or contraction will cause the tubes to bow out to a greater or lesser extent. For instance, if steam is admitted to the tubes when they are cold the sudden expansion of the tubing will increase the deflection of the middle portion of the tube out of a straight line connecting its ends and will consequently tend to crack off any accumulated scale which may have formed on the tube. By arranging the tube in its initial position so that it is bowed but very slightly, an increase in temperature will deflect the middle of the tube a maximum distance and will thus exert a maximum cracking action upon the accumulated scale. Likewise, when the apparatus is shut down for the purpose of cleaning the tubes, cold water may suddenly be admitted to the hot tubes and the resulting contraction of the metal will effectually crack off substantially all of the accumulated scale. However, this action occurs to a greater or less extent at all times during the operation of the apparatus, inasmuch as the temperature of the tubes frequently changes due to admission of a greater or lesser quantity of steam, and the like. The effect is that a lesser total quantity of scale accumulates over a given period than is the case where straight tubes are employed. This feature is of particular importance in degassing apparatus of this type inasmuch as the liquid is fed through the apparatus at a relatively high rate and the quantity of scale precipitated is correspondingly large. The tubes 7 may be circular in cross section, but if desired, the cracking action upon the accumulated scale may be enhanced as will be later described by distorting the tube section out of its circular form as, for instance, into the shape of an oval.

In Fig. 4 I have shown a tube bundle consisting of a number of U-tubes 15 supported at one end from a single tube sheet 8, the cover plate 9 being divided into two compartments by a central partition 14 for the incoming and discharged liquid, respectively. The U-tubes 15 are not of circular cross section but are distorted into some form other than circular, the modification shown comprising tubes of oval section. When the tubes 15 are subjected to an abrupt temperature change such as by admitting cold water to the hot tubes, the stresses in the metal of the tubes tend to return the distorted cross section to a circular form. The resulting flexure of the tube surface exerts a cracking action on the accumulated scale and loosens it from the tubes. Thus, a tube bundle of this construction accomplishes substantially the same results as does the type of bundle composed of slightly bowed tubes of circular cross section, the flexure of the tubes in this case being occasioned by a change of cross section rather than a deflection along the length of the tube.

In the embodiment shown in Fig. 6 I have provided a heating element consisting of a plurality of double spiral coils 16 positioned one above the other within the shell 1$^a$. The coils may be arranged in horizontal planes, as shown, or they may be arranged in vertical planes and positioned side by side along the horizontal length of the shell, if desired. Each coil element 16 consists of two flat spiral coils, as shown in Figs. 7 and 8, formed from a continuous length of tubing. This type of heating element possesses advantages under certain conditions, and the coil element 16 may be readily formed by winding up a straight length of tubing upon a double conical mandrel and subsequently flattening out into the conformation shown the two portions of the tubing thus wound.

A certain flexure of the coil surface will be obtained upon an abrupt change in temperature, but to enhance this effect I preferably employ tubing of oval section. Thus, upon change of temperature the coil tubing will tend to become circular in section and will consequently crack off the scale accumulated on its periphery. A further advantage is secured from the use of the oval tube section in that when the flat sides of the oval tubing are wound adjacent, as shown in Fig. 8, an increased distance is available between adjacent coil turns. Thus the likelihood of scale bridging completely over from one turn to another is reduced.

A somewhat similar coil element is shown in Fig. 9 except that only a single flat spiral is employed. It is readily seen from the drawing that a considerable flexure of the element will occur upon subjecting it to an abrupt change in temperature and a corresponding cracking effect will be exerted upon the accumulated scale. However, if desired, this coil element 17 may be formed of tubing having an oval section so that its scale cracking properties may be more pronounced. In any case the ends 18 of the spiral coil elements are preferably left round for convenience in attachment to the inlet and outlet manifolds.

I have shown a still further modified form of heating element in Fig. 10, in which upper and lower manifolds 19 are employed and helical coils 20 extend between them and furnish the required heat transferring surface. I may construct the helical coils 20 of oval sectional tubing so that the scale cracking properties above described may be incorporated in this embodiment, the coils preferably being so wound that the flat sides of the oval tubing will lie adjacent and thus provide for an increased distance between successive coil turns. This type of heating element I have found to be particularly adapted to operate in a completely submerged condition. When operating completely submerged the deposit of scale forming impurities on the heating coils is less pronounced and occurs more uniformly over their entire surfaces.

I have illustrated and described various embodiments of a degassing apparatus provided with a heating element of such nature that the accumulated scale may be readily removed. It is the essential idea of this application to provide in a degassing apparatus of the class described a heating element which will satisfactorily operate under conditions where a relatively large quantity of impurities is continually being precipitated, and in which the accumulated scale is readily removed from the heating surfaces, the particular means resorted to in the disclosures of the drawings being a flexure of the heat transferring surfaces themselves. It is evident that further modifications which possess the above described self scaling properties may be devised without departing from the spirit of this invention, and such changes and modifications may be made within the scope of the claims.

I claim:—

1. In a degassing apparatus for liquids a containing shell, a liquid receiving surface within said shell capable of being substantially distorted from its initial shape, means for distributing liquid over said surface in a relatively thin film and means for heating said film of liquid to effect deæration thereof and precipitation of scale forming impurities therefrom, whereby deformation of said surface effects removal of the scale deposit thereon.

2. In a degassing apparatus for liquids, a containing shell heat transferring tubes within said shell adapted to be flexed upon subjection to temperature change, means for distributing the incoming liquid over the outer surfaces of said tubes in the form of a thin film, means whereby heating fluid may be passed through said tubes for heating the said film of liquid to substantially the boiling point corresponding to the pressure within said shell to thereby effect deæration of said liquid and precipitation upon the tube surface of the scale forming impurities contained in said liquid and means whereby said tubes may be flexed to effect exfoliation of said deposited scale.

3. In a degassing apparatus for liquids, a containing shell, means for maintaining within said shell a pressure substantially below atmospheric, a plurality of heat transferring tubes within said shell, means for distributing liquid over surfaces of said tubes in the form of a relatively thin film, means for reducing the partial air pressure of said film of liquid to substantially zero, whereby said film of liquid is deæerated and relieved of its scale forming impurities, the said impurities depositing upon the tube surfaces in the form of a relatively soft deposit due to the effect of the said reduced pressure and means whereby said tubes may be flexed to effect removal of the said scale deposit.

In testimony whereof I affix my signature.

RUSSELL C. JONES.